US010193932B2

(12) United States Patent
Carlson et al.

(10) Patent No.: US 10,193,932 B2
(45) Date of Patent: Jan. 29, 2019

(54) REAL-TIME ENERGY DATA PUBLISHING SYSTEMS AND METHODS

(71) Applicant: SolarCity Corporation, San Mateo, CA (US)

(72) Inventors: Eric Daniel Carlson, San Mateo, CA (US); Karthikeyan Varadarajan, Mountain View, CA (US); Franklin Aguinaldo, Daly City, CA (US)

(73) Assignee: SolarCity Corporation, San Mateo, CA (US)

( * ) Notice: Subject to any disclaimer, the term of this patent is extended or adjusted under 35 U.S.C. 154(b) by 461 days.

(21) Appl. No.: 14/921,142

(22) Filed: Oct. 23, 2015

(65) Prior Publication Data

US 2016/0134116 A1    May 12, 2016

Related U.S. Application Data

(60) Provisional application No. 62/078,335, filed on Nov. 11, 2014.

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *H04L 29/06* | (2006.01) |
| *H02J 13/00* | (2006.01) |

(52) U.S. Cl.
CPC ........ *H04L 65/1059* (2013.01); *H02J 13/002* (2013.01); *H02J 13/0062* (2013.01)

(58) Field of Classification Search
CPC .. H04L 65/1059; H02J 13/002; H02J 13/0062
USPC ......................................................... 700/296
See application file for complete search history.

(56) References Cited

U.S. PATENT DOCUMENTS

| | | | | |
|---|---|---|---|---|
| 6,532,233 | B1 * | 3/2003 | Matsunaga | ........... H04L 12/185 370/390 |
| 8,965,590 | B2 * | 2/2015 | Boardman | .......... H02J 13/0079 700/289 |
| 9,641,026 | B2 * | 5/2017 | Boardman | .......... H02J 13/0079 |
| 9,785,129 | B2 * | 10/2017 | Bhageria | ................ G05B 15/02 |
| 9,881,033 | B2 * | 1/2018 | Boardman | ........ G06F 17/30292 |
| 9,923,723 | B2 * | 3/2018 | Akyol | .................... H04L 9/3247 |
| 2002/0116342 | A1 * | 8/2002 | Hirano | ................. G06Q 10/087 705/64 |
| 2002/0173308 | A1 * | 11/2002 | Dorenbosch | ............ H04L 51/04 455/435.1 |

(Continued)

*Primary Examiner* — Viet Q Nguyen
(74) *Attorney, Agent, or Firm* — Kilpatrick Townsend & Stockton LLP

(57) ABSTRACT

Embodiments of the present technology may include a method to enable real-time data requests. The method may include subscribing to real-time data enable requests for a device on an energy generation (EG) network. The method may also include intercepting, from a requester, a request for real-time data for the device on an EG system within the EG network. The method may further include publishing a single request to the device to post a single measurement corresponding to the real-time data request. The single request may be published at less than or equal to a predetermined frequency for a request cycle that lasts for a predetermined duration.

17 Claims, 10 Drawing Sheets

(56) References Cited

U.S. PATENT DOCUMENTS

| | | | | |
|---|---|---|---|---|
| 2005/0037706 A1* | 2/2005 | Settle | ............... | H04B 7/18586 455/12.1 |
| 2005/0053029 A1* | 3/2005 | Lee | ............... | H04W 74/008 370/328 |
| 2005/0063330 A1* | 3/2005 | Lee | ............... | H04W 72/0413 370/328 |
| 2005/0101326 A1* | 5/2005 | Kang | ............... | H04W 36/0055 455/436 |
| 2006/0089164 A1* | 4/2006 | Lee | ............... | H04W 4/12 455/466 |
| 2008/0039118 A1* | 2/2008 | Hyun | ............... | H04W 8/08 455/456.1 |
| 2009/0172173 A1* | 7/2009 | Chatras | ............... | H04L 29/06027 709/228 |
| 2011/0035287 A1* | 2/2011 | Fox | ............... | G06Q 30/02 705/14.69 |
| 2011/0066297 A1* | 3/2011 | Saberi | ............... | F16K 31/046 700/287 |
| 2012/0130556 A1* | 5/2012 | Marhoefer | ............... | H02J 3/32 700/291 |
| 2013/0063272 A1* | 3/2013 | Bhageria | ............... | H02J 13/001 340/650 |
| 2013/0063273 A1* | 3/2013 | Bhageria | ............... | G08B 21/00 340/653 |
| 2013/0091147 A1* | 4/2013 | Kim | ............... | G06Q 30/00 707/748 |
| 2013/0326387 A1* | 12/2013 | Kim | ............... | G06T 11/40 715/772 |
| 2014/0146699 A1* | 5/2014 | Axmon | ............... | H04W 24/10 370/252 |
| 2014/0314412 A1* | 10/2014 | Soto | ............... | H04L 12/2898 398/67 |
| 2016/0371753 A1* | 12/2016 | Ling | ............... | G06Q 10/06 |
| 2017/0212788 A1* | 7/2017 | Zeng | ............... | G06F 9/505 |

* cited by examiner

REAL-TIME ENERGY DATA PUBLISHING SYSTEMS AND METHODS

CROSS REFERENCE TO RELATED APPLICATIONS

The present application claims the benefit of U.S. Provisional Application No. 62/078,335, filed Nov. 11, 2014, which is hereby incorporated by reference for all purposes.

This application is related to U.S. Application No. 62/163,200 filed on May 18, 2015; U.S. application Ser. No. 14/794,389 filed Jul. 8, 2015; U.S. application Ser. No. 14/741,327 filed Jun. 16, 2015; U.S. application Ser. No. 14/697,353 filed Apr. 27, 2015; U.S. application Ser. No. 14/802,811 filed Jul. 17, 2015; and U.S. application Ser. No. 14/802,581 filed Jul. 17, 2015, each of which is incorporated herein by reference in its entirety for all purposes.

BACKGROUND

The present disclosure relates in general to energy generation energy storage and/or energy consuming systems, and in particular to a real-time enabler for managing communicating with such systems.

In recent years, increasing energy costs, climate change concerns, federal/state initiatives, and/or other factors have driven a rapid rise in the installation of renewable energy generation systems (i.e., systems that generate energy using renewable resources such as solar, wind, hydropower, etc.) at residential and non-residential sites. Solar photovoltaic (PV) systems, in particular, have been very popular.

The majority of this PV capacity is "grid-connected"—in other words, tied to the utility-maintained electrical grid. This allows site loads to be serviced from the grid at times when the PV system cannot generate sufficient energy due to lack of sunlight (e.g., at night), while enabling energy to be fed back into the grid at times when PV energy production exceeds site loads (thereby resulting in, e.g., a credit on the site owner's electricity bill and allowing the benefits of this energy conveyed to others on the grid).

One limitation with grid-connected PV systems is that, unlike a traditional power plant, the PV system power output is intermittent and not dispatchable. This means that the PV system is limited in its ability to provide power capacity at times of peak grid loads. The PV system is also limited in its ability to balance grid voltage and frequency variability, and to supply energy when prices are most economic. Most PV systems are reliant on the presence of a utility grid to operate due to safety regulations in place to protect utility workers, meaning the PV system cannot supply local loads when the utility grid is shut down or otherwise unavailable. Thus, in the case of a grid blackout, such systems cannot act as a backup energy source to power critical site loads, regardless of the amount of sunlight being received at the time of the blackout. To address this, systems have been developed that integrate grid-connected PV components with an on-site energy storage subsystem, such as a battery device and a battery inverter/charger.

Despite the advantages associated with integrating grid-connected PV energy generation with on-site energy storage, there are a number of challenges that make it difficult to efficiently deploy and control such integrated systems, particularly on a large, distributed scale. For example, certain systems may utilize a communications scheme where devices of a remote site are closely bound to a central server. That is, the server is tightly coupled with the communication protocol, communication method, data processing, logging, database storage, and other aspects. This reduces flexibility in communication, making modifications to the server and/or the remote devices challenging to implement and test.

A communications scheme utilizing close binding between the central server and client may also create latency issues, where all of the devices attempt to connect to the server at the same time. Delays may also arise from such a centralized communication architecture requiring data to pass through a database between applications.

Furthermore, a variety of different types of end devices (e.g., inverters, batteries, controllable loads, PV devices, etc. of various makes and models) may be present across the different sites. Such end devices implement numerous protocols and behaviors, offering a heterogeneous interface for communications purposes. This variability in the device interfaces may be manifested throughout the system, in site gateway, backend server, and user interface (UI) code.

Additionally, a single gateway may be tasked with communicating different types of information and commands to a plurality of devices located at the site. In such a communication scheme the site gateway can serve as a bottleneck. Specifically, undifferentiated communication passing between the site gateway and the end devices can result in delays due to limitation in processing capacity and/or transmission congestion. Embodiments of the present technology address and/or improve communication involving EGS systems and also provide other improvements.

SUMMARY

Energy generation and storage (EGS) systems may involve communication between many different components. The components may include devices at the EGS site, including, for example, PV inverters, battery devices, and energy meters. These components may communicate their real-time energy generation or energy consumption status to a user, an operator, or any person or system requesting these or similar data. The components may send the data through a site gateway, a central server, and/or other entities. A portion of the communication may include networks that are bandwidth limited, including cellular or radio networks. Furthermore, the data from one or more devices may be requested by several requesters at or around the same time. Additionally, many EGS systems may be tied to a single site gateway or central server. Data requests, if unmanaged, may overwhelm communications or equipment related to an EGS system. The use of a real-time enabler to manage messages exchanged between publishers and subscribers of data may alleviate problems with processing capacity and/or transmission congestion.

Some embodiments may include a method to enable real-time data requests. The method may include subscribing to real-time data enable requests for a device on an energy generation (EG) network. The method may also include intercepting, from a requester, a request for real-time data for the device on an EG system within the EG network. The method may further include publishing a single request to the device to post a single measurement corresponding to the real-time data request. The single request may be published at less than or equal to a predetermined frequency for a request cycle that lasts for a predetermined duration.

Embodiments of the present technology may include an energy generation network. The EG network may include a device configured to post real-time data, a computer system, a real-time enabler, and a message bus server. The real-time enabler may be communicatively coupled to the device. The computer system may be communicatively coupled to the real-time enabler. The message bus server may be communicatively coupled to the device. The computer system may include a non-transitory computer readable medium storing a first plurality of instructions that when executed control the computer system to request real-time data from the device. The real-time enabler may include a secondary non-transitory computer medium storing a second plurality of instructions that when executed control the real-time enabler to publish a single request to the device for real-time data corresponding to the real-time data request at less than or equal to a predetermined frequency for a predetermined duration. The second plurality of instructions may also include intercepting, from the computer system, a request for real-time data for the device. The message bus server may include a third non-transitory computer medium storing a third plurality of instructions that when executed control the message bus server to deliver messages comprising real-time data from the device to the computer system.

Some embodiments may include a computer system. The computer system may include a non-transitory computer readable medium storing a plurality of instructions that when executed control the computer system to send a single measurement corresponding to a real-time data request to a requester. The plurality of instructions may also include intercepting, from the requester, a request for real-time data for the device on an energy generation (EG) system within an EG network. The plurality of instructions may further include publishing a single request to the device to post the single measurement corresponding to the real-time data request. Publishing the single request may include publishing at least than or equal to a predetermined frequency for a request cycle that lasts for a predetermined duration.

DETAILED DESCRIPTION

The present disclosure relates to systems and methods for managing communications with a grid-connected energy generation, consumption, and/or storage (EGS) systems. In particular, a power management Message Bus System (MBS) and a real-time enabler facilitate communication between various entities in a distributed energy generation/storage deployment, where the entities can include on-site devices, central control systems, user interface systems, logging systems, etc. The MBS operates according to a subscribe/publish scheme, with each respective device functioning as a subscriber and/or publisher. The MBS employs a message structure comprising a topic component and a device identifier (ID) component. A gateway at each local site includes an MBS client configured to interact with a remote MBS server. The real-time enabler manages communication through the MBS. Without the real-time enabler, each request for real-time data may result in a request through the MBS and/or a site gateway. The request may then result in a device sending real-time data through the site gateway and the MBS. As the number of requests for real-time data increase, bandwidth-limited communication networks, the site gateway, central server, and the devices themselves may be strained, even to the point that real-time data may not be received by the requester. The real-time enabler may allow for a method of managing real-time data requests. The real-time enabler may throttle the requests sent to devices and may eliminate redundant or largely redundant requests for real-time data from a device.

For purposes of illustration, several of the examples and embodiments that follow are described in the context of EGS systems that use solar PV technology for energy generation and battery technology for energy storage. However, embodiments of the present technology are not limited to such implementations. For example, in some embodiments, alternative types of energy generation technologies (e.g., wind turbine, solar-thermal, geothermal, biomass, hydropower, etc.) may be used. In other embodiments, alternative types of energy storage technologies (e.g., compressed air, flywheels, pumped hydro, superconducting magnetic energy storage (SMES), etc.) may be used. One of ordinary skill in the art will recognize many modifications, variations, and alternatives.

Figure 1:
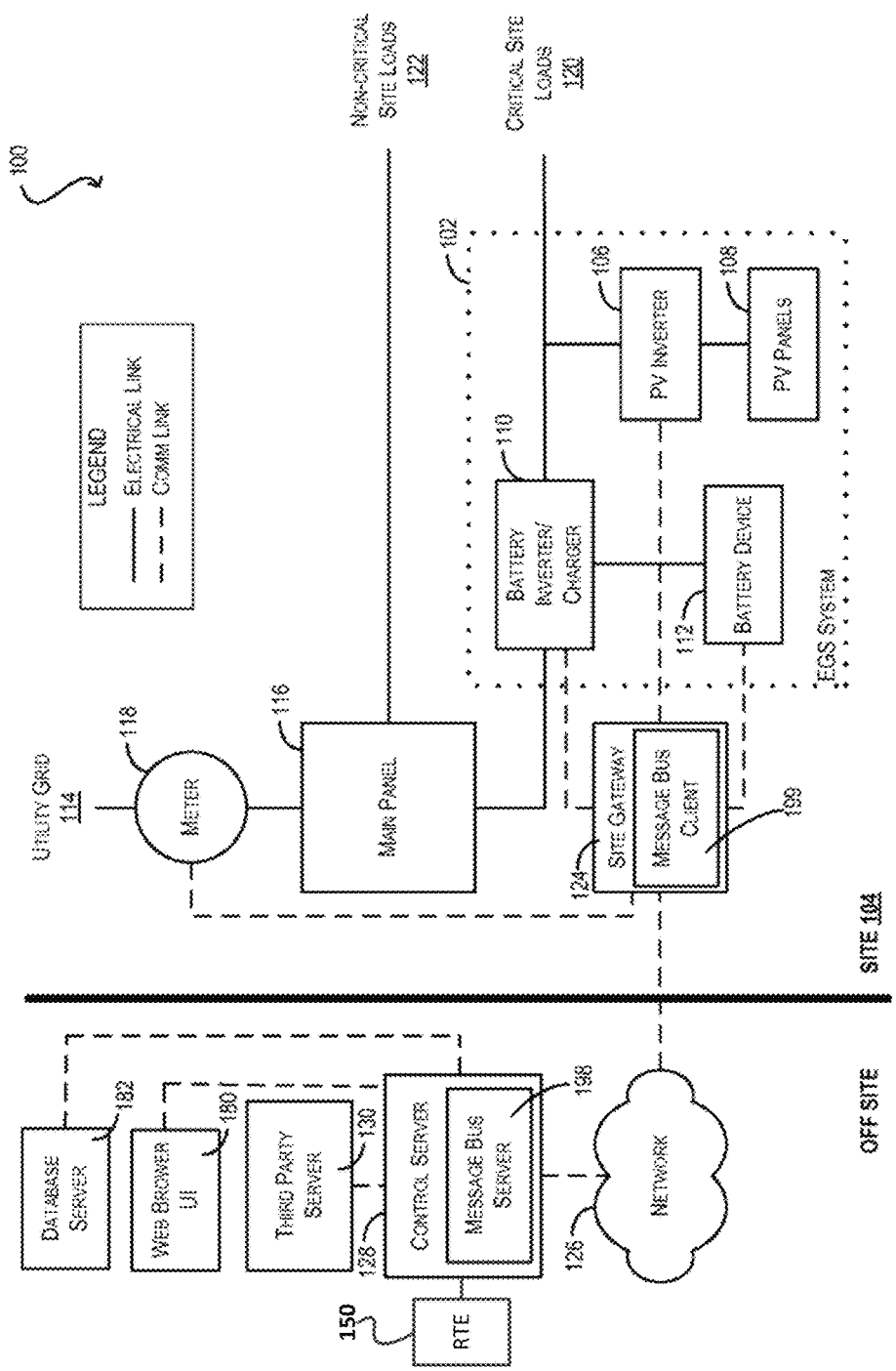
FIG. 1 is a simplified block diagram of a system environment according to embodiments.

FIG. 1 is a simplified block diagram of a system environment 100 according to an embodiment of the present invention. As shown, system environment 100 includes an energy generation and storage (EGS) system 102 that is installed at a site 104 (e.g., a residence, a commercial building, etc.). EGS system 102 includes a PV-based energy generation subsystem comprising a PV inverter 106 and one or more PV panels 108, and a battery-based energy storage subsystem comprising a battery inverter/charger 110 and a battery device 112. In some embodiments, PV inverter 106 and battery inverter/charger 110 can be combined into a single device. In the example of FIG. 1, EGS system 102 is grid-connected; thus, PV inverter 106 and battery inverter/charger 110 are electrically connected to the utility grid (114) via a main panel 116 and a utility meter 118. Further, to provide power to site 104, utility grid 114, PV inverter 106, and battery inverter/charger 110 are electrically connected to critical site loads 120 and non-critical site loads 122.

Integrated EGS systems such as system 102 provide a number of advantages over energy generation systems that do not incorporate any on-site energy storage. For example, excess energy produced by PV components 106 and 108 can be stored in battery device 112 via battery inverter/charger 110 as a critical reserve. Battery inverter/charger 110 can then discharge this reserved energy from battery device 112 when utility grid 114 is unavailable (e.g., during a grid blackout) to provide backup power for critical site loads 120 until grid power is restored. As another example, battery device 112 can be leveraged to "time shift" energy usage at site 104 in a way that provides economic value to the site owner or the installer/service provider of EGS system 102. For instance, battery inverter/charger 110 can charge battery device 112 with energy from utility grid 114 (and/or PV inverter 106) when grid energy cost is low. Battery inverter/ charger 110 can then dispatch the stored energy at a later time to, e.g., offset site energy usage from utility grid 114 when PV energy production is low/grid energy cost is high, or sell back the energy to the utility when energy buyback prices are high (e.g., during peak demand times). Still, in some embodiments, battery device 112 may not be included.

Centralized management of EGS systems such as system 102 has been difficult, particularly at the large scale needed for the residential and commercial markets where up to millions of individual systems may need to be managed. To address this, system environment 100 can include a site gateway 124 and a control server 128. Site gateway 124 is a computing device (e.g., a general purpose personal computer, a dedicated device, etc.) that is installed at site 104. As shown, site gateway 124 is communicatively coupled with on-site components 106, 110, 112, 118, and 140, as well as with control server 128 via a network 126. In one embodiment, site gateway 124 can be a standalone device that is separate from EGS system 102. In other embodiments, site gateway 124 can be embedded or integrated into one or more components of system 102. Control server 128 is a server computer (or a cluster/farm of server computers) that is remote from site 104. Control server 128 may be operated by, e.g., the installer or service provider of EGS system 102, a utility company, or some other entity.

In one embodiment, site gateway 124 and control server 128 can carry out various tasks for monitoring the performance of EGS system 102. For example, site gateway 124 can collect system operating statistics, such as the amount of PV energy produced (via PV inverter 106), the energy flow to and from utility grid 114 (via utility meter 118), the amount of energy stored in battery device 112, and so on. Site gateway 124 can then send this data to control server 128 for long-term logging and system performance analysis.

More significantly, site gateway 124 and control server 128 can operate in tandem to actively facilitate the deployment and control of EGS system 102. Specifically, FIG. 1 shows other entities remote from the site (OFF SITE), that may communicate with the EGS system. These other entities include a web server 180 and a database server 182. Database server 182 can store unique identification (ID) numbers to aid subscribers in determining which topics they should subscribe to in order to receive messages from devices of interest.

According to certain embodiments, a real-time enabler (RTE) 150 can be implemented off-site and function as a server-side component connected to the message bus and acting as an intermediary between publisher devices at customer sites and subscribers (e.g., web clients, loggers, etc.) to provide a variety of functions. One such function is message throttling—when multiple subscribers need real-time or near real-time updates from a publisher device, the RTE receives ENABLE messages from those subscribers and sends a single GET poll message to the publisher device at predetermined time intervals, or immediately upon receipt of a measurement from the publisher device. This can avoid situations where the publisher device is inundated with GET messages from different subscribers, thereby potentially causing the publisher device to saturate the communication link between the device and the site gateway, and/or between the site gateway and the message bus. Additionally this method may reduce or eliminate the need for the publisher device to track redundant GET poll messages. In FIG. 1, although RTE 150 is directly coupled to control server 128, other configurations are contemplated. For example, RTE 150 may be a part of control server 128 or may be a separate entity. RTE 150 may by physically coupled to control server 128, executing on a different server or wirelessly coupled thereto. There may be multiple RTE 150 instances, each assigned to servicing a subset of publisher devices within the system. In one embodiment, an instance of the RTE 150 may execute on a computer co-located with publisher devices. The myriad possibilities of implementing and integrating RTE 150 in system 100 would be appreciated by one of ordinary skill in the art with the benefit of this disclosure. Embodiments of real-time enabler 150 are further discussed below with respect to FIGS. 7-8.

Message Bus System

According to embodiments, communication between the various elements involved in power management (e.g., between the centralized control server and the various devices at the remote site, and/or between the centralized control server 128 and various other remote devices such as the database server, web server, etc.) may be achieved through use of a power management Message Bus System (MBS). In the simplified view of FIG. 1, the MBS is implemented utilizing a message bus server 198, and a message bus client 199 located at the site gateway. In FIG. 1, the message bus server is shown as being on the control server 128, but this is not required and in some embodiments the message bus server could be on a separate machine and/or part of a separate server cluster.

The power management MBS as described herein, facilitates communication between the various entities (e.g., on-site devices, central control systems, distributed control systems, user interface systems, logging systems, third party systems etc.) in a distributed energy generation and/or storage deployment. The MBS operates according to a subscribe/publish model, with each respective device functioning as a subscriber and/or publisher, utilizing a topic of a message being communicated. According to such a publish/subscribe model, subscribers subscribe to specific topics in which they are interested. In certain embodiments, these topics may be organized according to a hierarchy.

This subscription logic would be handled by a separate software component in the MBS client for each site device (in the case of on-site subscribers). This subscription information is persisted by the MBS server.

Publishers publish to predefined topics that they are configured to disseminate info about. This publishing logic would again be handled by separate software components in the MBS client for each site device. In certain embodiments, the software components handling publication may be the same components as the subscription components.

Upon publication, based on the message topic, the MBS server consults the subscription information. The MBS server then delivers the message to those devices subscribing to that particular topic.

The presence of the power management MBS introduces flexibility into the communication of messages through the power management system. In particular, the individual devices themselves are permitted to publish and subscribe according to a message topic. Utilization of the power management MBS also serves to enhance the availability and visibility of the communicated information, because messages are published and hence available to all subscribing entities. Further details regarding the power management MBS are provided below in connection with FIG. 7.

System environment 100 is illustrative and not intended to limit embodiments of the present invention. For instance, although FIG. 1 depicts control server 128 as being connected with a single EGS system (102) at a single site (104), server 128 can be simultaneously connected with a fleet of EGS systems that are distributed at multiple sites. In these embodiments, control server 128 can coordinate the scheduling of these various systems/sites to meet specific goals or objectives. In further embodiments, the various components depicted in system 100 can have other capabilities or include other subcomponents that are not specifically described. Furthermore, multiple instances and variants of the control server may exist, each communicating with one or more other control servers, EGS systems and/or other devices connected to the MBS. One of ordinary skill in the art will recognize many variations, modifications, and alternatives.

Real-Time Enabler

Multiple requesters (e.g., web clients) requesting real-time data from a single device on an EG site can hamper MBS systems due to high bandwidth requirements, low latency expectations, and limited message management resources. A real-time enabler can help to manage the flow of request of real-time data for any device in a system.

According to certain embodiments, a real-time enabler can be implemented off-site and may function as a server-side component that is connected to the message bus acting as an intermediary between publisher devices at customer sites and subscribers (e.g., web clients, loggers, etc.) to enable a variety of features, including message throttling, fast and consistent acquisition of real-time data, provisioning real-time data to multiple requesters, and centralizing the RTE algorithm.

Message throttling can be advantageous when multiple subscribers need real-time or near real-time updates from a publisher device. In such cases, the RTE receives ENABLE messages from those subscribers and sends a single poll message to the publisher device at predetermined time intervals. This can avoid situations where the publisher device is inundated with GET messages from different subscribers, thereby potentially causing the publisher device to saturate the communication link between the device and the site gateway, and/or between the site gateway and the message bus. Similar situations are described later in FIG. 12.

Access to real-time data is fast and consistent for all requesters due to a centralized RTE algorithm that works the same for all clients. In contrast, logic executed at a user interface (e.g., web client) may treat real-time data different than other user interfaces, with different protocols and treatments for network bandwidth and latency issues. Thus, different users may experience different performance characteristics.

A real-time enabler can provide multiple requesters (e.g., web clients, data loggers, etc.) with real-time data without significant loading of the system. This is performed by intercepting one or more requests for real-time data from any one device in a network, and sending a single request in their place to control the timing (e.g., frequency and duration) of the published data.

In one non-limiting example, multiple user interfaces request data from a particular device (e.g., PV battery) at an EG site (e.g., with path Req: /device/realtime/enable/[id]). Each of the multiple user interfaces request real-time data, which can be computationally expensive and bandwidth limiting. The RTE intercepts all of the real-time data requests and sends a single message (e.g., "get" request) to the device to request a single data measurement, which can be significantly less burdensome on the system (e.g., Req: /device/realtime/get/[id]). The RTE can send subsequent requests (e.g., a logic loop) at a predetermined frequency and duration. The predetermined frequency may be one request every 100 milliseconds to 1 minute. For example, the predetermined frequency may be one request every 100 milliseconds to 30 seconds, 100 milliseconds to 1 second, 1 second to 5 seconds, 5 seconds to 10 seconds, 10 seconds to 20 seconds, 20 seconds to 30 seconds, or 30 seconds to 1 minute. The predetermined duration may be from 1 minute to 30 minutes, including, for example, from 5 minutes to 30 minutes, 1 minute to 2 minutes, 2 minutes to 5 minutes, 5 minutes to 10 minutes, 10 minutes to 20 minutes, or 20 minutes to 30 minutes. The predetermined frequency may depend on the characteristics of the device. For example, the predetermined frequency may be based on how quickly the device can post real-time data or on the speed of the communications protocol the device uses to post real-time data. In some embodiments, the predetermined frequency may be for the total of number requests on a plurality of devices (including all devices) that are part of the EG system or electrically linked to the EG system. In this manner, the predetermined frequency may be set to avoid straining bandwidth of communication pathways related to an EG system.

In some embodiments, the RTE sends subsequent requests to the device each time it receives a posted response from the device. Each of the subscribing multiple user interfaces receive the measurements published by the particular device (e.g., Req: /device/realtime/post/[id]). In some embodiments, a request (RTE) or response (Device) may be lost, corrupted, etc. In such cases, the RTE typically resends the request until it is fulfilled. Thus, the system saturating multiple real-time data requests can be consolidated into a single request from the RTE.

In some embodiments, the RTE includes a timeout indicating how long the RTE will keep requesting the subscribed data. In one non-limiting example, the data is requested every 10 seconds for 15 minutes. Any suitable timing criteria can be implemented.

There are several advantages to performing the RTE logic at a centralized location. First, it prevents UI's from directly communicating with field devices (e.g., PV inverters, batteries, etc.) at an EG site, which could otherwise compromise security and control and data traffic. Second, an inferior solution may have a site gateway publish data every 10 seconds, eliminating the need for an RTE solution. However, this can become problematic as every site gateway across thousands of systems would each publish data at the same time, creating a potentially unmanageable and unnecessarily onerous message volume.

In another non-optimal configuration, the RTE can be put on the gateway itself, which would task the gateway itself to be responsible for sending/receiving messages on the MBS. However, this is not an optimal solution as system or software updates could potentially require updates to millions of gateways, versus a single change to a centralized RTE, as described. Additionally, including the RTE on the gateway itself may result in the RTE being inoperable if the gateway is inoperable, which may often be the case when an EG system is being installed. For instance, if a technician is at a site when the gateway is not yet fully operational and the technician opens up a webpage on the technician's mobile, then the RTE would not be operational and requests for real-time data may be lost. If, on the other hand, the RTE were at a central server, the technician would be able to request real-time data through the RTE. The requests for real-time data may be queued and retried until the queried device is operational and online.

Figure 2:
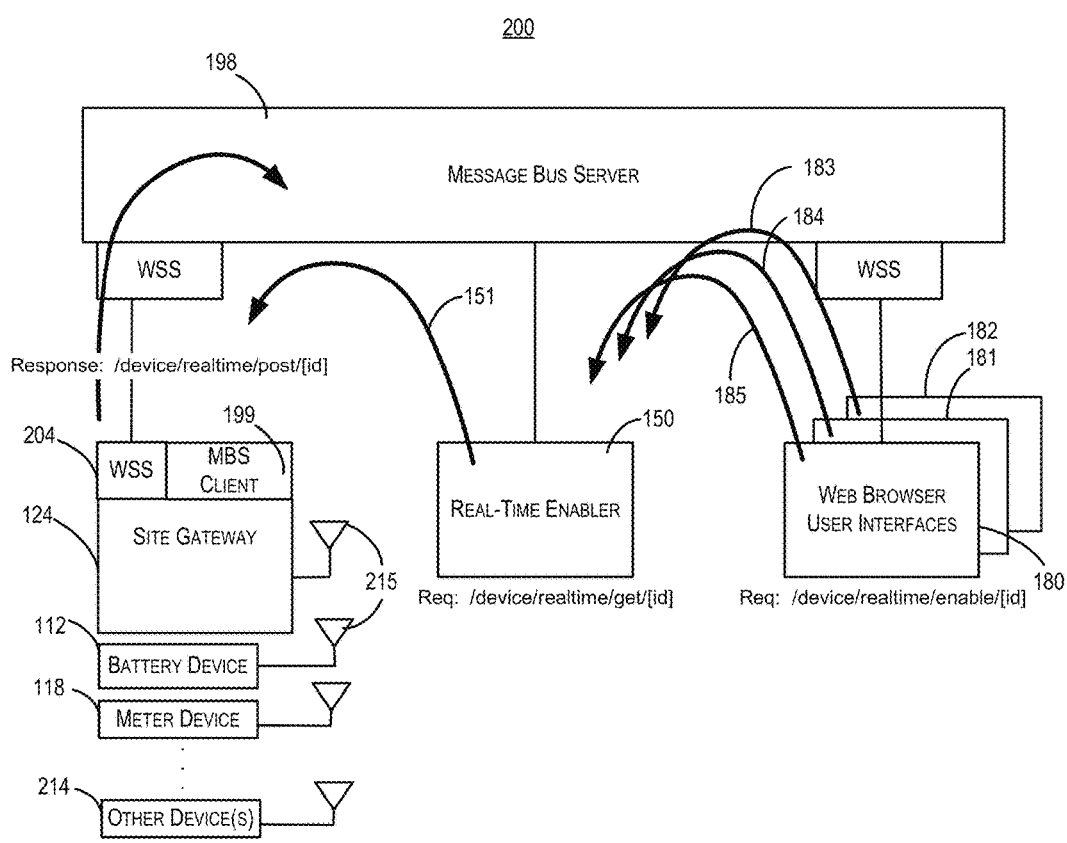
FIG. 2 shows details of the power generation and/or storage site with a real-time enabler according to embodiments.

FIG. 2 shows details of the power generation and/or storage site, according to certain embodiments of the invention. The power management MBS 200 comprises a centralized bus that is in communication with the local power generation and/or storage site 104 through various servers, including a message bus server 198. In particular, also shown are the site gateway 124, and the WSS (Web Socket Server) and MBS client 199 through which the gateway is in communication with the server-side component of the MBS. The power management comprises a centralized bus that is in communication with the local power generation and/or storage site through various servers, including a message bus server 198 and a Websocket Server (WSS) 204. This configuration allows use of the Websocket web browser standard communication protocol, in order to communicate between embedded gateways and the MBS server. Here, the MBS server, MBS client, and WSS may be implemented by software.

Embodiments, however, are not limited to use of the Websocket communication protocol, or to any other specific communication protocol. Examples of communication protocols which could be utilized by a power management MBS according embodiments, can include but are not limited to high messaging protocols such as AQMP, MQTT, or STOMP, XMPP, HTTP, TCP, UDP.

FIG. 2 also shows respective local devices 112, 118, 106, and 214 with which the site gateway is in contact. Examples of these devices can include but are not limited to photovoltaic (PV) battery device 112, meter device 118, inverter device 106, and other device(s) 214.

The site gateway may be in contact with the various devices through a wired and/or wireless network. Specifically shown in this embodiment, is contact between the site gateway and the various devices via radio frequency (RF) communication through antennae 215.

However, embodiments are not limited to this particular form of communication, and others are possible. Examples of types of communication which may be effected between the site gateway and various devices can include but are not limited to wired communication (e.g., Ethernet, CAN, RS232, RS485, etc.) and/or wireless communication (e.g., ZigBee, Wi-Fi, cellular, etc.).

As shown in FIG. 2, multiple real-time data requests 183-185 for a particular device (e.g., battery device 112) on an EG site are generated by a plurality of web browser user interfaces 180-182. RTE 150 intercepts each request and generates a new single request 151 that corresponds to the real-time data requests of UI 180-182. A response is published by the device (e.g., battery device 112).

Multiple such web browser interfaces are possible. For example, one web browser interface may be available for use by the owner of the site, e.g., a residential homeowner on whose roof the PV devices are installed.

Another web browser interface may be available to a site administrator. The administrator could utilize the web browser interface to interrogate and control the devices in order to manage safety and effective generation and/or storage of power at the site.

The MBS may be in further communication with a database server. This database may be responsible for storing information relevant to operation of the EGS system across one or more of the sites. The database may store information regarding performance attributes of various devices of this and other EGS systems.

Figure 3:
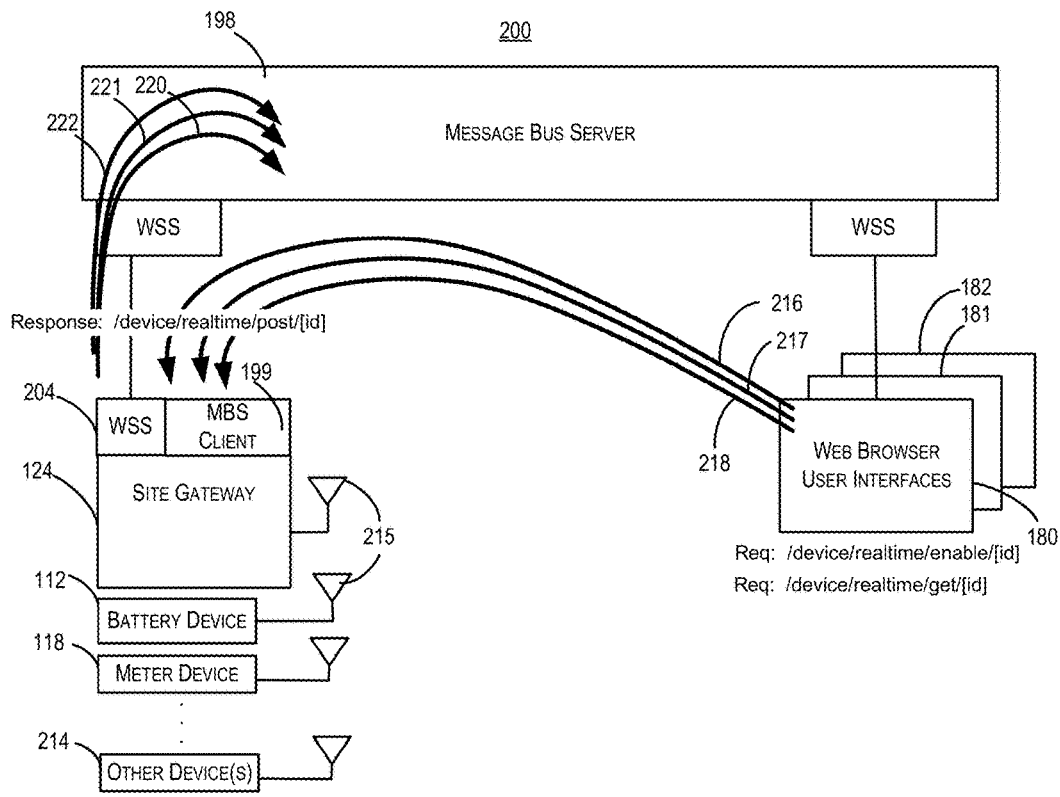
FIG. 3 shows details of the power generation and/or storage site without a real-time enabler according to embodiments.

In contrast to FIG. 2, conventional systems without real-time enablers, such as the one shown in FIG. 3, carry disadvantages in providing real-time data. Without a real-time enabler, web browser user interfaces 180, 181, and 182 send three separate real-time data requests 216-218 to a device, without going through a real-time enabler. The real-time enabler in FIG. 2 generates a single request for data from the device. Without the real-time enabler, three requests are sent to the device. As a result, the device then publishes three separate responses 220-221 to message bus server 198 instead of a single response.

Figure 4:
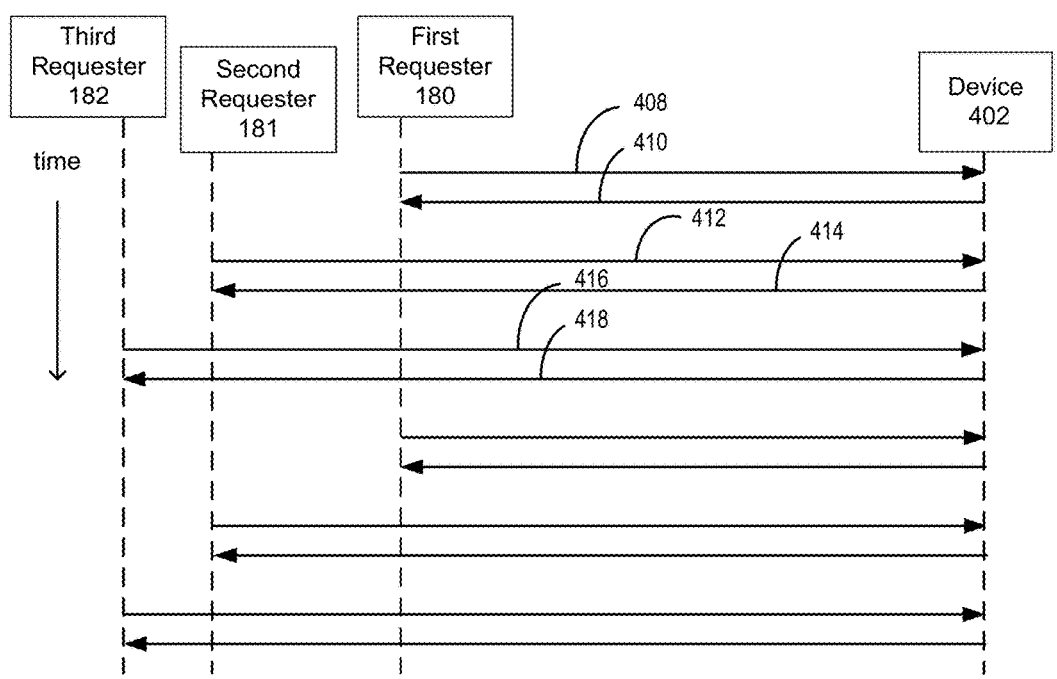
FIG. 4 shows an example of handling requests from multiple requesters without a real-time enabler.

FIG. 4 shows in a time series the handling of requests from multiple requesters without a real-time enabler in FIG. 3. Time is increasing moving from the top of figure to the bottom of the figure. First requester 180, second requester 181, and third requester 182 may each request real-time data from device 402. Requesters 180-182 may be the web browser user interfaces from FIG. 3. Device 402 may be battery device 112, meter device 118, or other device 214 in FIG. 3. First requester 180 may request real-time data from device 402, as shown with arrow 408. In response, device 402 sends the measurement corresponding to the real-time data, as shown with arrow 410. At a later time, second requester 181 requests real-time data from device 402, as shown with arrow 412. Device 402 then sends the single measurement to second requester 181, as shown with arrow 414. Similarly, at a later time, third requester 182 may request real-time data and receive real-time data from device 402, as shown with arrow 416 and arrow 418. Because requesters 180-182 seek real-time data and not a single data point, the requests for real-time data from the three requesters and the sending of real-time data to the requesters repeat. Compared to handling requests shown in FIG. 2, FIGS. 3 and 4 show that not using a real-time enabler would increase the publishing of requests to the device and increase the posting of responses to the message bus server. With three requesters, the traffic in certain communication paths triples. The tripling in the publishing of requests would triple the bus load and/or triple the traffic on communication pathways between device 402 and requesters 181-183. Increasing the number of requesters beyond three may exacerbate load and bandwidth issues.

Figure 5:
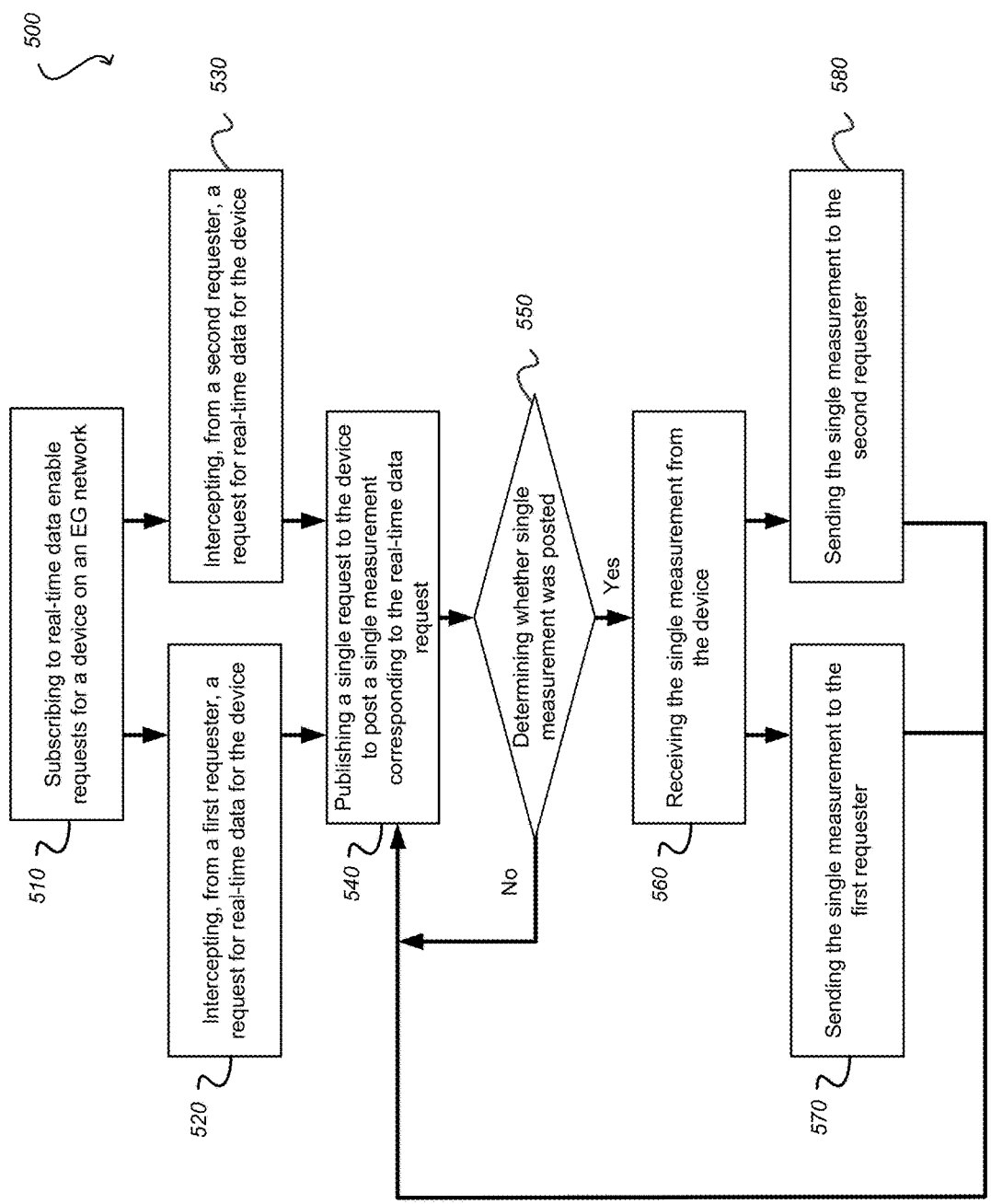
FIG. 5 is a simplified flow chart for a method of controlling the distribution of data by a real-time enabler according to embodiments.

FIG. 5 is a simplified flow chart for a method 500 of controlling the distribution of data with a real-time enabler, according to certain embodiments of the invention. Method 500 can be performed by processing logic that may comprise hardware (circuitry, dedicated logic, etc.), software (such as is run on a general purpose computing system or a dedicated machine), firmware (embedded software), or any combination thereof. In one embodiment, method 500 can be performed by a processor on control server 128, RTE 150, and/or other suitable computing system.

At step 510, method 500 may include subscribing to real-time data requests for a device on an EG network. That is, a requester may be choose to receive messages about real-time data for a device on the EG network. Real-time data for the device may include energy generation, energy storage, and/or energy load data of the device. At step 520, method 500 may include intercepting a request for real-time data for a device from a first requester. The request can originate from any suitable entity including single or multiple web clients, data loggers, and the like. At step 530, method 500 may include intercepting, from a second requester, a request for real-time data for the device. Intercepting the request from the second requester may occur within a predetermined sampling period after intercepting the request from the first requester. The sampling period may be greater than the predetermined frequency of the publishing of the single request. Although not shown in FIG. 5, method 500 may include intercepting any requests from any requester on the EG network. Similarly, method 500 may include intercepting all requests from all requesters on the EG network. A plurality of requesters may be accessing the EG network. The EG network may include a plurality of EG systems. For example, the plurality of EG systems may include 2 or more, 5 or more, 10 or more, 20 or more, 50 or more, 100 or more, 500 or more, or 1,000 or more EG systems. A plurality of EG systems may be communicatively coupled to a single site gateway.

At step 540, a single request may be published to the device to post a single measurement corresponding to the real-time data request. Even though method 500 may include a plurality of requesters and a plurality of requests for real-time data for the device, method 500 may include only a single request to the device to post a single measurement. As used herein, "single" means one and only one.

At step 550, method 500 may include determining whether the single measurement was posted. If the single measurement was not posted in response to the single request within a predetermined timeout period, method 500 may include publishing a second single request to the device to post the single measurement. The predetermined timeout period may be greater than the reciprocal of the predetermined frequency. In embodiments, the predetermined timeout period may be greater than or equal to 20%, 30%, 40%, 50%, 60%, 70%, 80%, 90%, 100%, or 200% longer than the reciprocal of the predetermined frequency of publishing the single request. In some embodiments, the predetermined timeout period may be from 5 seconds to 5 minutes. For example, the predetermined timeout period may be from 10 seconds to 1 minute, 10 seconds to 20 seconds, 20 seconds to 30 seconds, 30 seconds to 40 seconds, 40 seconds to 50 seconds, 50 seconds to 1 minute, 1 minute to 2 minutes, 2 minutes to 3 minutes, 3 minutes to 4 minutes, or 4 minutes to 5 minutes. In some embodiments, the predetermined timeout period may be the period from the last posting rather than the last request.

Figure 8:
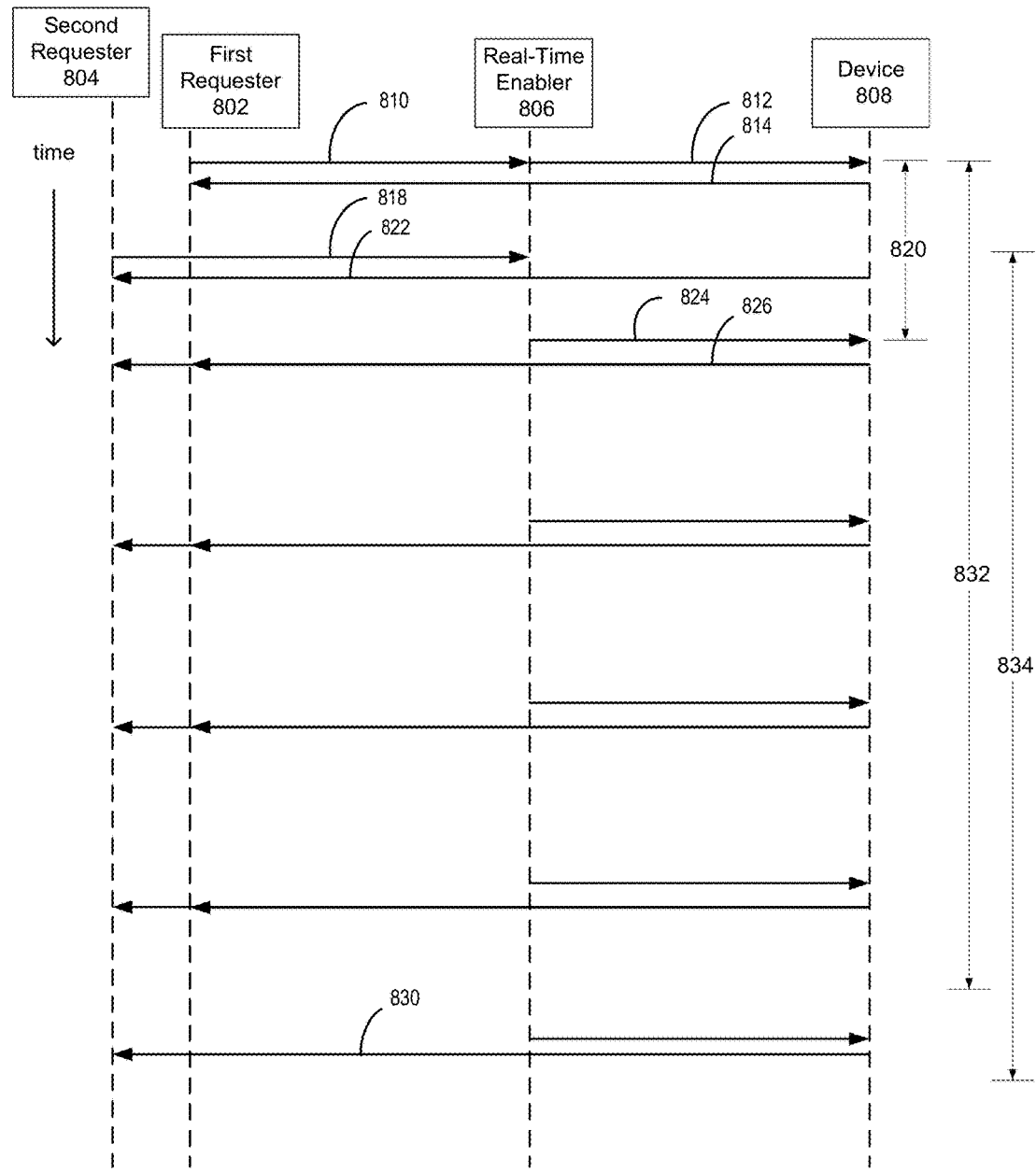
FIG. 8 shows an example of how two requesters may request and receive real-time data from the same device.

If the single measurement was posted in response to the single request within the predetermined timeout period, method 500 may include, at step 560, receiving the single measurement from the device. Although determining whether the single measurement was posted and receiving the single measurement from the device in FIG. 8 are shown as two separate steps, the steps may occur simultaneously or nearly simultaneously. Put another way, if the single measurement is received from the device, then the single measurement can be determined to have been posted.

At step 570, method 500 may include sending the single measurement to the first requester. At step 580, method 500 may include sending the single measurement to the second requester. If method 500 includes more than two requesters, then method 500 may include sending the single measurement to the additional requesters.

After sending the single measurement to one or more requesters, method 500 may repeat publishing a single request to the device at step 540. Publishing the single request may occur at less than or equal to a predetermined frequency. Publishing the single request may be repeated for a request cycle that lasts for a predetermined duration.

The specific steps illustrated in FIG. 5 provide a particular method 800 of controlling the distribution of data by a real-time enabler, according to certain embodiments of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 500.

Figure 6:
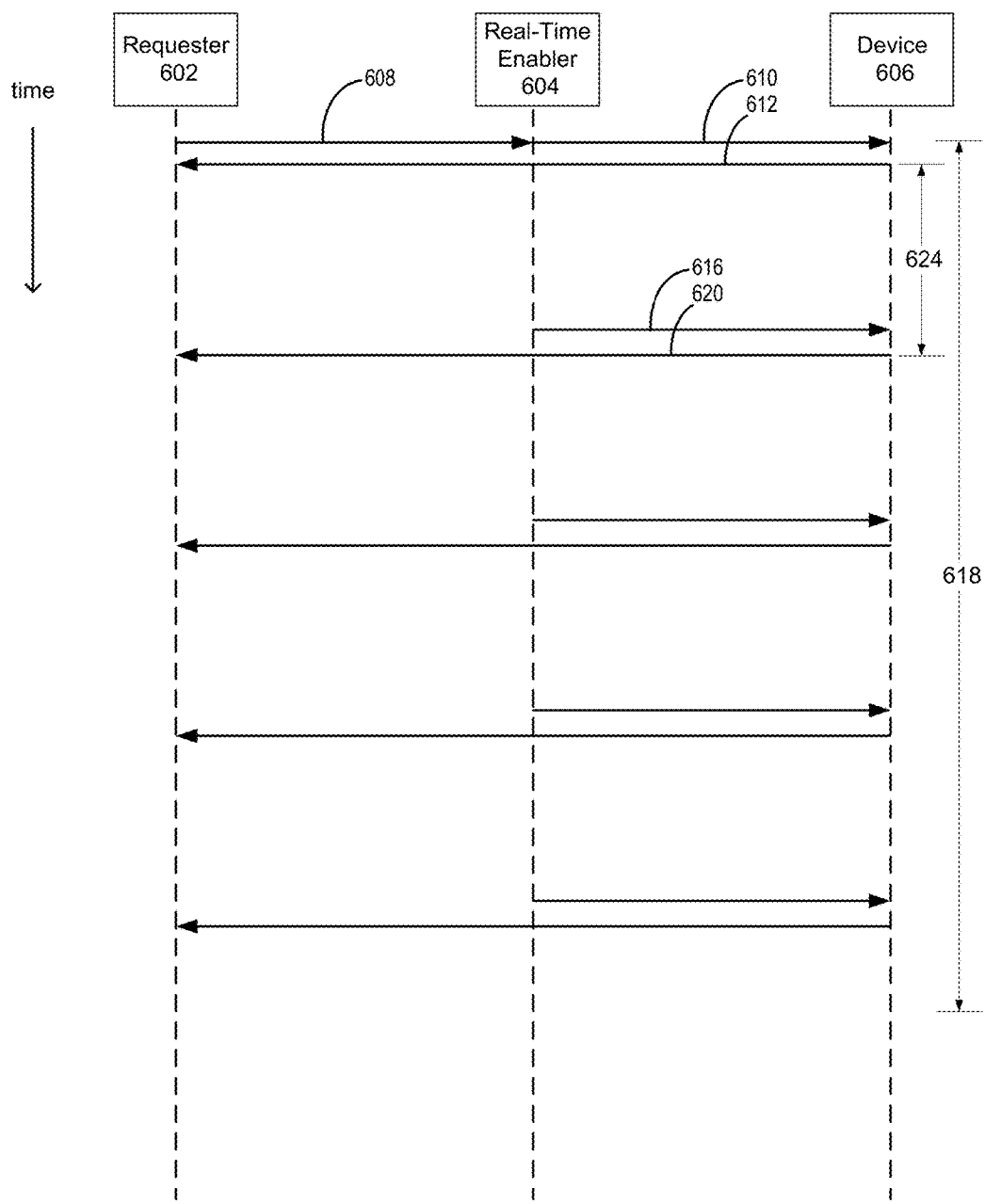
FIG. 6 shows an example of interactions between a requester, a real-time enabler, and a device.

FIG. 6 shows an example of interactions between requester 602, a real-time enabler 604, and a device 606. At some time, requester 602 requests real-time data for device 606. The real-time data from the requester is intercepted by real-time enabler 604, as depicted by arrow 608. This interception interaction may involve a command similar in form to /realtime/enable. Real-time enabler 604 then publishes a single request to the device to post a single measurement corresponding to the real-time data request, as illustrated by arrow 610. The publishing interaction may involve a command such as /realtime/get. Device 606 receives the post request and posts a measurement corresponding to the real-time data request. A command involved in the posting of the measurement may be /realtime/post. Requester 602 then receives the single measurement from device 606, as shown with arrow 612. The receiving of the single measurement from device 606 may first go through a message bus server before being received by requester 602, which may be subscribed to these messages. The messages bus server is not shown in FIG. 6 to simplify the diagram. In some embodiments not shown in FIG. 6, device 606 may send the single measurement to requester 602 to real-time enabler 604 before requester 602 receives the single measurement.

Figure 9:
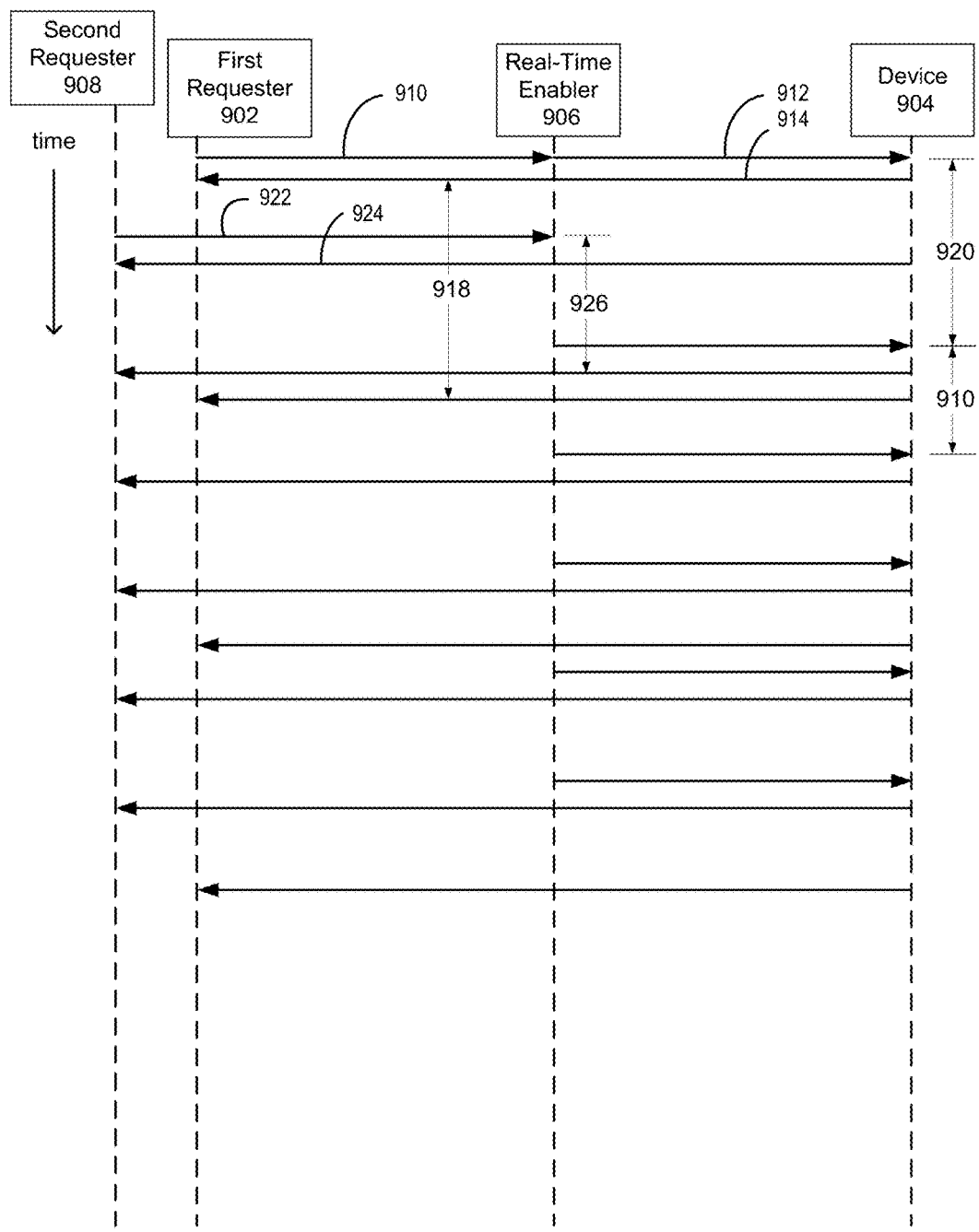
FIG. 9 shows an example of two requesters requesting real-time data from a device at different frequencies.

At a later time, real-time enabler 604 publishes another request, indicated by arrow 616, to device 606 to post a single measurement. At this later time, requester 602 does not request the real-time data, as it did with arrow 608, for the initial request included a request for real-time data, not just one data point. The initial request may include a request for real-time data over a certain duration 618. In response to the published request from the real-time enabler 604, device 606 posts the single measurement at the later time, and requester 602 receives the single measurement, as shown by arrow 620. The publishing by real-time enabler 604 of single requests for real-time data from device 606 may be repeated at a predetermined frequency for duration 618. In FIG. 9, the reciprocal of the predetermined frequency (the period) is shown as period 624.

Figure 7:
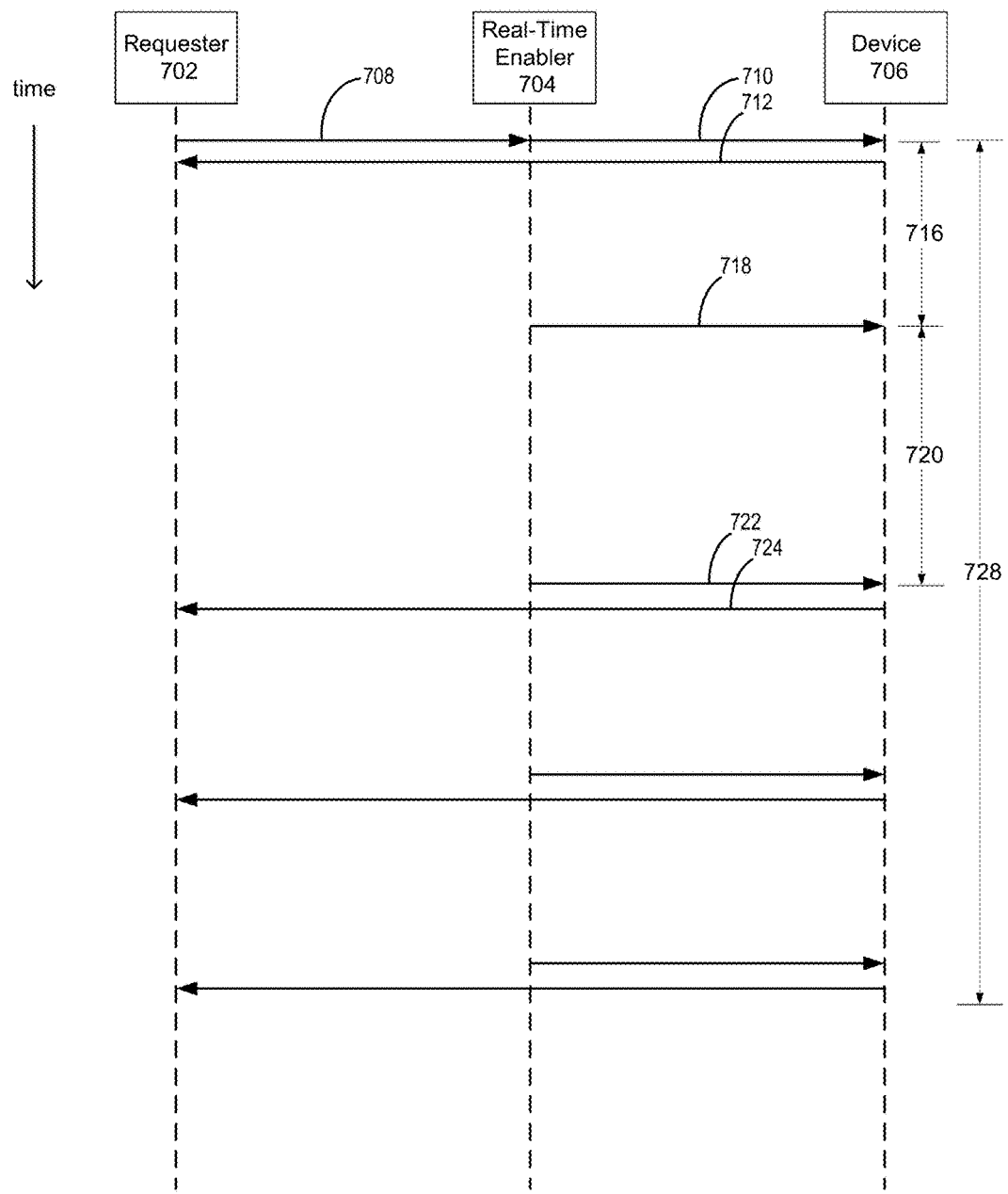
FIG. 7 shows an example of when a single measurement is not posted during a sample timeout period.

FIG. 7 shows an example of when a single measurement is not posted during a sample timeout period. The initial interactions between requester 702, real-time enabler 704, and device 706 may be similar to the initial interactions described in FIG. 6. At some time, requester 702 requests real-time data for device 706. The real-time data from the requester is intercepted by real-time enabler 704, as depicted by arrow 708. Real-time enabler 704 then publishes a single request to the device to post a single measurement corresponding to the real-time data request, as illustrated by arrow 710. Device 706 receives the post request and posts a measurement corresponding to the real-time data request. Requester 702 then receives the single measurement from device 1006. The posting and receiving of the single measurement is shown with arrow 712.

After predetermined period 716, real-time enabler 704 publishes a request for real-time data from device 706, as shown by arrow 718. In this example, device 706 fails to post a single measurement, and/or requester 702 fails to receive the single measurement. The failure of the single measurement to be received by requester 702 may be a result of one of many factors, including problems with device 706 communications equipment, failure of device 706 equipment to capture a single measurement, problems with the network between device 706 and the gateway, problems with the network between the gateway and requester 702, or failure of hardware of the message bus server. If no single measurement has been determined to have been received in a sample timeout period 720 after publishing a single request (arrow 718), real-time enabler 704 publishes an additional single request for real-time data from device 706, as shown by arrow 722. After the publishing of this single request, the single measurement from device 706 is posted and received by requester 702 (arrow 724). Real-time enabler 704 then repeats publishing the single requests for until duration 728 has elapsed from the initial publishing of the single request. Because in one instance no single measurement was posted and real-time enabler 704 delayed publishing a subsequent request for a sample timeout period 720, which is longer than the predetermined period 716, the overall frequency of the publishing of the single requests is less than the predetermined frequency (reciprocal of predetermined period 716).

FIG. 8 shows an example of how two requesters may request and receive real-time data from the same device. First requester 802, second requester 804, real-time enabler 806, and device 808 may be in communication with each other. Similar to what has been previously described in FIGS. 6 and 7, first requester 802 may request real-time data from device 808, and real-time enabler 806 may intercept the request for real-time data, as shown with arrow 810. Real-time enabler 806 may publish a single request to device 808, as shown with arrow 812. Requester 802 may receive the single measurement from device 808, as shown with arrow 814. Second requester 804 may request real-time data from device 808, as shown with arrow 818), but in a time sooner than predetermined period 820 after real-time enabler 806 published the previous request (arrow 812). Real-time enabler 806 may limit publishing the single request to no more than once per predetermined period 820. In other words, no more than one single request may be published during predetermined period 820. Accordingly, real-time enabler 806 does not publish an additional request to device 808. Second requester 804 receives the single measurement, as shown with arrow 822. The single measure in arrow 822 is the same single measurement sent earlier to the first requester (arrow 814) and may come directly from the message bus server.

At the predetermined period 820 after publishing the single request in arrow 812, real-time enabler 806 publishes another single request, as shown with arrow 824. First requester 802 and second requester 804 then receive the single measurement from device 808, as shown with arrow 826. The single measurement from device 808 may first pass through the message bus server before arriving at the requesters. First requester 802 and second requester 804 may receive the single measurement at the same time or about the same time. In some embodiments, real-time enabler 806 or the message bus server may delay sending the single measurement to second requester 804 to manage bandwidth or processing power (of real-time enabler 1106, the message bus server, and/or a computer system used by second requester 1104). This procedure of publishing a single request, receiving a single measurement, and sending the measurement to the requesters (arrows 824 and 826) is repeated with publishing the single request occurring at a frequency equal to one over predetermined period 820. First requester 802 may only request real-time data for predetermined duration 832. Thus, after predetermined duration 832, first requester 802 does not receive the single measurement from device 808. In contrast, second requester 804 may also request real-time data for predetermined duration 834. Predetermined duration 834 may be the same length as predetermined duration 832 for the first requester. However, because the initial request from second requester 804 (arrow 818) occurred after the initial request from first requester 802 (arrow 810), real-time enabler 806 may publish requests and send measurements to second requester 804 after first requester 802 has stopped receiving measurements. Second requester 804 may receive a single measurement (arrow 830) after predetermined period 832 for first requester 802 has elapsed.

FIG. 9 shows an example of first requester 902 requesting real-time data from device 904 through real-time enabler 906 at a different frequency than second requester 908. In this example, second requester 908 requests real-time data from device 904 at a higher frequency than first requester 902. The request for higher frequency data from device 904 may be a result of increased processing power involving the second requester, higher bandwidth associated with second requester 908, requester preference, or other factors. Similar to the examples in FIGS. 6, 7, and 8, first requester 902 requests real-time data for device 904, and real-time enabler 906 intercepts the request, as shown with arrow 910. Real-time enabler 906 then publishes a single request to device 904 to post a single measurement corresponding to the real-time data request. First requester 902 receives a single measurement from device 904, as shown with arrow 914. The request by first requester 902 includes receiving real-time data at a predetermined frequency, which is the reciprocal of reception period 918. Reception period 918 is the same as publishing period 920. Before publishing period 920 elapses, second requester 908 requests real-time data, and real-time enabler 906 intercepts the request, as indicated by arrow 922. Real-time enabler 906 does not publish another request to device 904 and instead, second requester 908 receives the single measurement received previously (arrow 914), as shown with arrow 924. Second requester 908 requests receiving real-time data at a higher predetermined frequency than first requester 902. The higher predetermined frequency is the reciprocal of reception period 926. As a result of the request for higher frequency real-time data from second requester 908, real-time enabler 906 publishes more frequent single requests to device 904, and second requester 908 receives the single measurement from device 904. First requester 902 continues to receive single measurements from device 904 at first requester's predetermined frequency, without real-time enabler 906 publishing an additional request to device 904. Unlike in FIG. 8, FIG. 9 shows how each requester receives real-time data at a different frequency. Although not shown in FIG. 9, an embodiment of the present technology may include publishing a request to device 904 after the request from second requester 908 (arrow 922) and before the first receiving of the single measurement by second requester 908 (arrow 924). Whether to immediately publish a request after the request from second requester 908 depends on system priorities, device equipment, bandwidth constraints, and other factors.

Embodiments of the present technology may include an energy generation network. The EG network may include a device configured to post real-time data, a computer system, a real-time enabler, and a message bus server. The device may be a component of an EG system on the EG network or the device may be electrically coupled to the EG system. The device may be any device described herein. The real-time enabler may be communicatively coupled to the device. The real-time enabler may be located off site, which may be off the property that the EG system is located. In some examples, the real-time enabler may be more than 0.25 mile, 0.5 mile, 1 mile, 2 miles, 5 miles, or 10 miles away from the device. The computer system may be communicatively coupled to the real-time enabler. The computer system may include a first non-transitory computer readable medium storing a first plurality of instructions that when executed control the computer system to request real-time data from the device. The first plurality of instructions may also include instructions for subscribing to real-time data requests on the message bus server. The real-time enabler may include a second non-transitory computer medium storing a second plurality of instructions that when executed control the real-time enabler to publish a single request to the device for real-time data corresponding to the real-time data request at less than or equal to a predetermined frequency for a predetermined duration. The second plurality of instructions may also include intercepting, from the computer system, a request for real-time data for the device. The message bus server may include a third non-transitory computer medium storing a third plurality of instructions that when executed control the message bus server to deliver real-time data from the device to the computer system. The message bus server may be communicatively coupled to the device and to the computer system. The first, second, and third pluralities of instructions may include instructions for any of the methods described herein.

Some embodiments may include a computer system. The computer system may include a non-transitory computer readable medium storing a plurality of instructions that when executed control the computer system to send a single measurement corresponding to a real-time data request to a requester. The plurality of instructions may also include intercepting, from the requester, a request for real-time data for the device on an EG system within the EG network. The plurality of instructions may further include publishing a single request to the device to post the single measurement corresponding to the real-time data request. Publishing the single request may include publishing at least than or equal to a predetermined frequency for a request cycle that lasts for a predetermined duration. The plurality of instructions may include instructions for any of the methods described herein. The computer system may include processors in multiple locations, including on the device, in the real-time enabler, in the message bus server, on the EG system, and/or in the requesting computer system.

System Architectures

Figure 10:
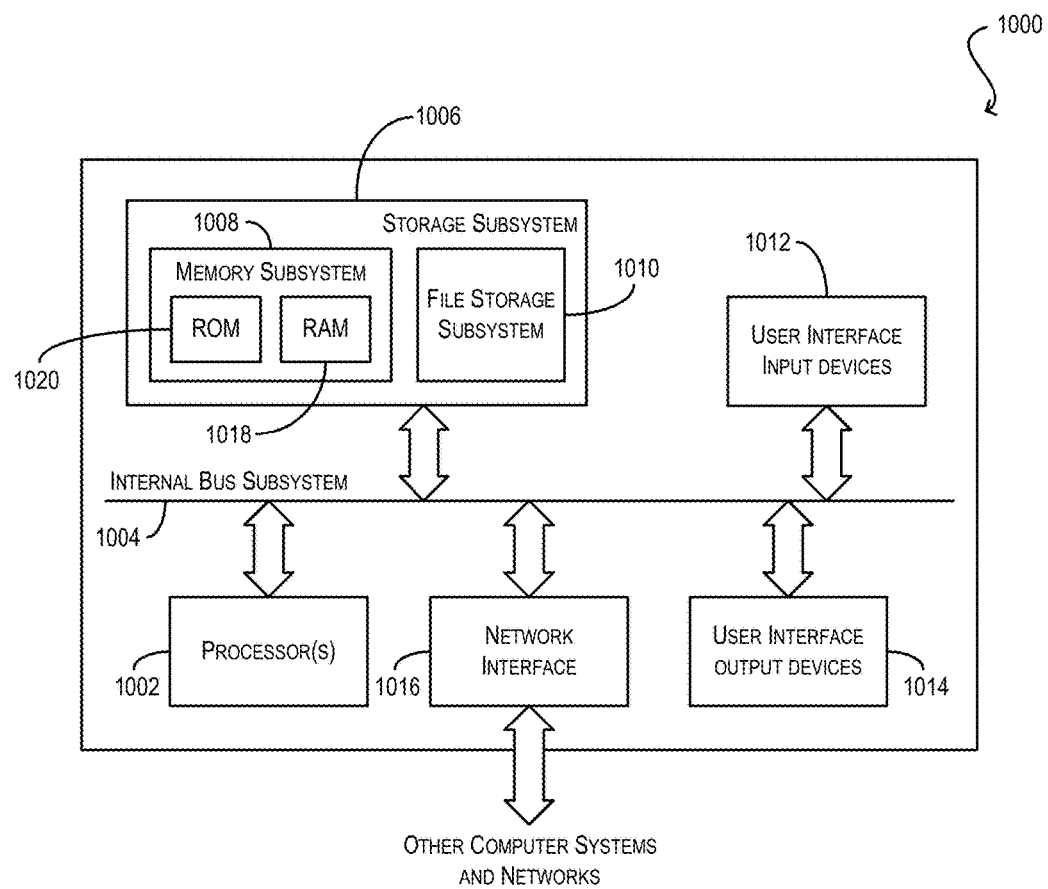
FIG. 10 is a simplified block diagram of a computer system according to embodiments.

FIG. 10 is a simplified block diagram of a computer system 1000 according to an embodiment of the present invention. Computer system 1000 can be used to implement any of the computer systems/devices (e.g., site gateway 124, control server 128, third-party server 130) described with respect to FIG. 1. As shown in FIG. 10, computer system 1000 can include one or more processors 1002 that communicate with a number of peripheral devices via a bus subsystem 1004. These peripheral devices can include a storage subsystem 1006 (comprising a memory subsystem 1008 and a file storage subsystem 1010), user interface input devices 1012, user interface output devices 1014, and a network interface subsystem 1016.

Internal bus subsystem 1004 can provide a mechanism for letting the various components and subsystems of computer system 1000 communicate with each other as intended. Although internal bus subsystem 1004 is shown schematically as a single bus, alternative embodiments of the bus subsystem can utilize multiple buses.

Network interface subsystem 1016 can serve as an interface for communicating data between computer system 1000 and other computer systems or networks (e.g., network 126 of FIG. 1). Embodiments of network interface subsystem 1016 can include wired interfaces (e.g., Ethernet, CAN, RS232, RS485, etc.) or wireless interfaces (e.g., ZigBee, Wi-Fi, cellular, etc.).

User interface input devices 1012 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 1000.

User interface output devices 1014 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 1000.

Storage subsystem 1006 can include a memory subsystem 1008 and a file/disk storage subsystem 1010. Subsystems 1008 and 1010 represent non-transitory computer-readable storage media that can store program code and/or data that provide the functionality of embodiments of the present invention.

Memory subsystem 1008 can include a number of memories including a main random access memory (RAM) 1018 for storage of instructions and data during program execution and a read-only memory (ROM) 1020 in which fixed instructions are stored. File storage subsystem 1010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and not intended to limit embodiments of the present invention. Many other configurations having more or fewer components than system 1000 are possible.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the device" includes reference to one or more devices and equivalents thereof known to those skilled in the art, and so forth. The invention has now been described in detail for the purposes of clarity and understanding. However, it will be appreciated that certain changes and modifications may be practice within the scope of the appended claims.

What is claimed is:

1. A method comprising:
    subscribing to real-time data enable requests for a device on an energy generation (EG) network;
    intercepting, from a first requester, a first request for real-time data for the device on an EG system within the EG network;
    intercepting, from a second requester, a second request for real-time data for the device within a predetermined period after intercepting the first request; and
    publishing a single request to the device to post a single measurement corresponding to the real-time data request; wherein:
        publishing the single request comprises publishing at less than or equal to a predetermined frequency for a predetermined duration, and
        the predetermined period is a reciprocal of the predetermined frequency.

2. The method of claim 1, further comprising:
    receiving the single measurement from the device, and
    sending the single measurement to the first requester.

3. The method of claim 1, further comprising:
    sending the single measurement to the first requester, and
    sending the single measurement to the second requester.

4. The method of claim 1, wherein the single request is published at the predetermined frequency.

5. The method of claim 1, wherein the single request to the device is a first single request to the device to post the single measurement, and
    further comprising:
    determining that the single measurement was not posted in response to the single request, and
    publishing a second single request to the device to post the single measurement when the single measurement is not received within a predetermined period after publishing the first single request to the device to post the single measurement, wherein the predetermined period is greater than a reciprocal of the predetermined frequency.

6. The method of claim 5, wherein the predetermined period is greater than or equal to 20% longer than the reciprocal of the predetermined frequency.

7. The method of claim 5, wherein the predetermined period is from 10 seconds to 1 minute.

8. The method of claim 1, wherein the request originates from a web client or a data logger.

9. The method of claim 1, wherein the predetermined frequency is one request every 100 milliseconds to 30 seconds.

10. The method of claim 1, wherein the predetermined duration is from 5 to 30 minutes.

11. The method of claim 1, wherein the intercepting is performed by a real-time enabler operating on a message bus system, and wherein the real-time enabler intercepts all real-time data requests from any requester on the EG network.

12. The method of claim 11, wherein the EG network comprises a plurality of EG systems.

13. The method of claim 1, wherein the predetermined frequency is based on the device.

14. The method of claim 1, wherein the real-time data is comprises energy generation or load data of the device.

15. A computer system comprising:
    a non-transitory computer readable medium storing a plurality of instructions that when executed control the computer system to send a single measurement corresponding to a real-time data request to a first requester, the plurality of instructions comprising:
    intercepting, from the first requester, a first request for real-time data for the device on an energy generation (EG) system within an EG network;
    intercepting, from a second requester, a second request for real-time data for the device within a predetermined period after intercepting the first request; and
    publishing a single request to the device to post the single measurement corresponding to the real-time data request; wherein:
        publishing the single request comprises publishing at less than or equal to a predetermined frequency for a request cycle that lasts for a predetermined duration, and
        the predetermined period is a reciprocal of the predetermined frequency.

16. The method of claim 1, wherein the predetermined duration is from 1 minute to 5 minutes.

17. The computer system of claim 15, wherein the predetermined frequency is one request every 100 milliseconds to 1 minute.

* * * * *